Feb. 16, 1965 E. A. PLACKE 3,170,114
MAGNETIC INSPECTION SEARCH SHOE MOUNT PROVIDING
MOVEMENT ABOUT MULTIPLE ORTHOGONAL AXES
Filed July 18, 1960 3 Sheets-Sheet 3
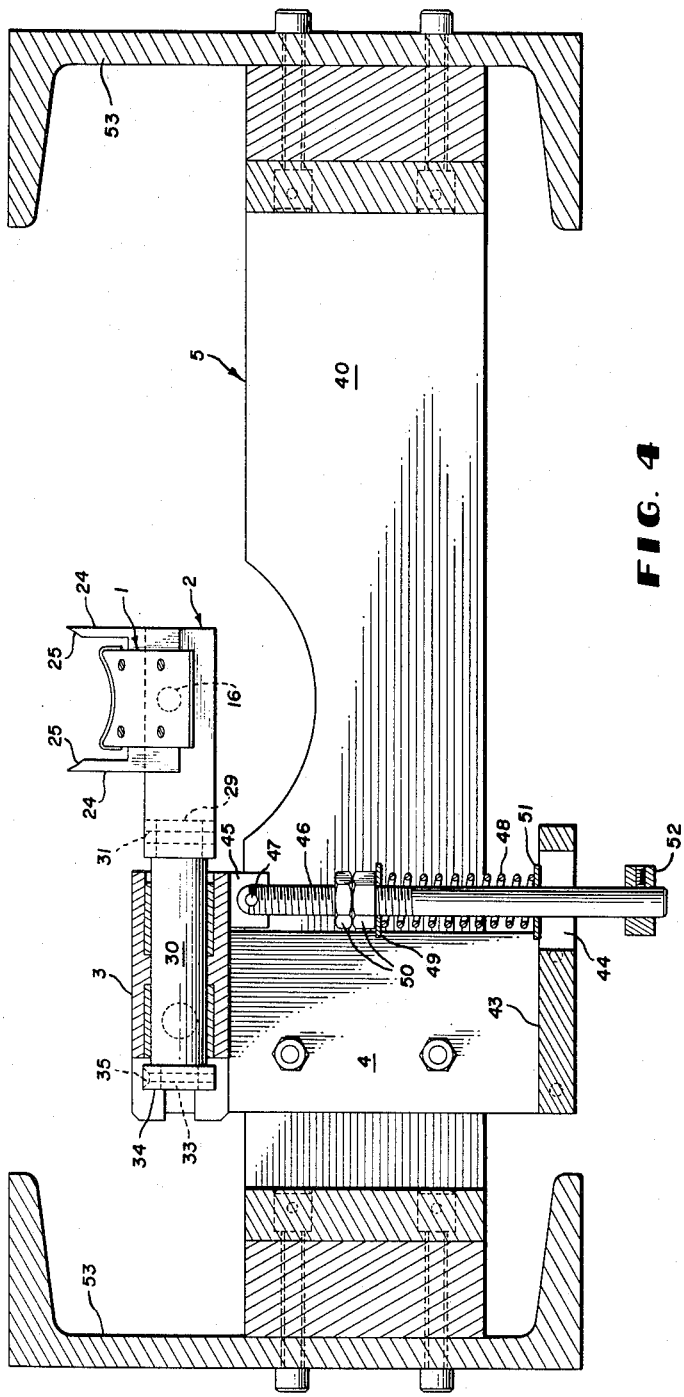
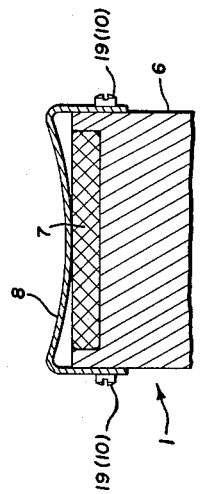
INVENTOR.
EUGENE A. PLACKE
BY Tom Arnold
D.C.Roylance
ATTORNEYS

United States Patent Office 3,170,114
Patented Feb. 16, 1965

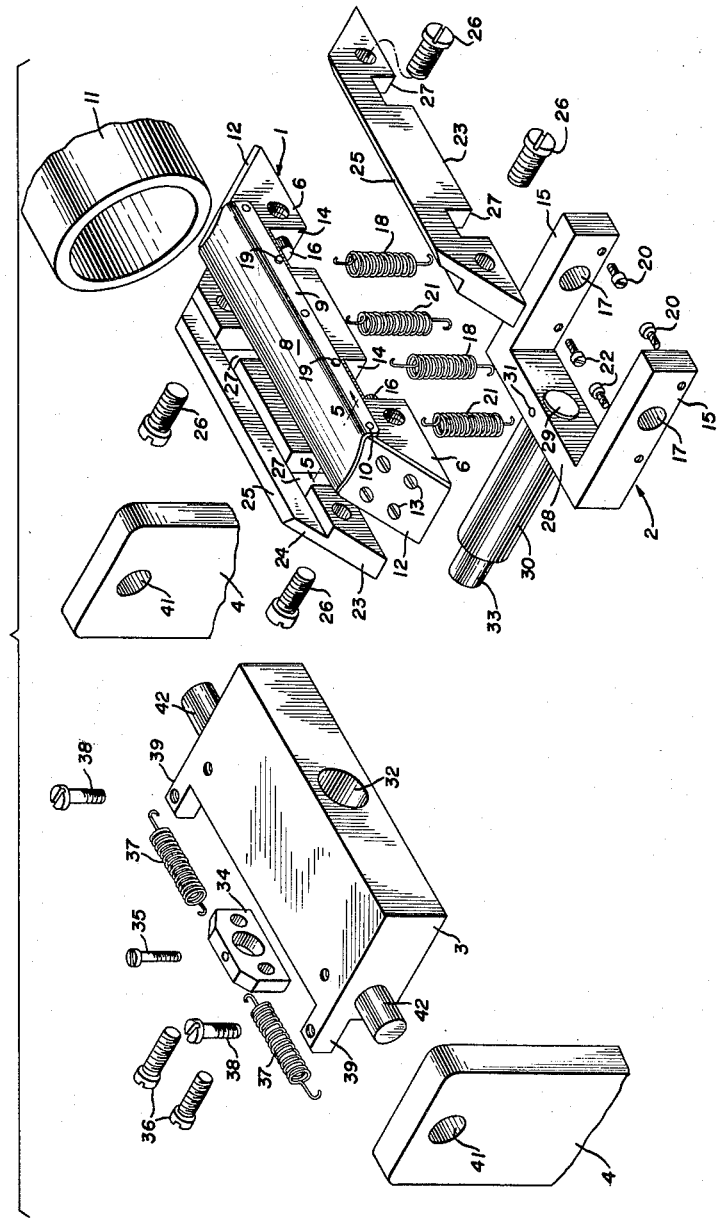

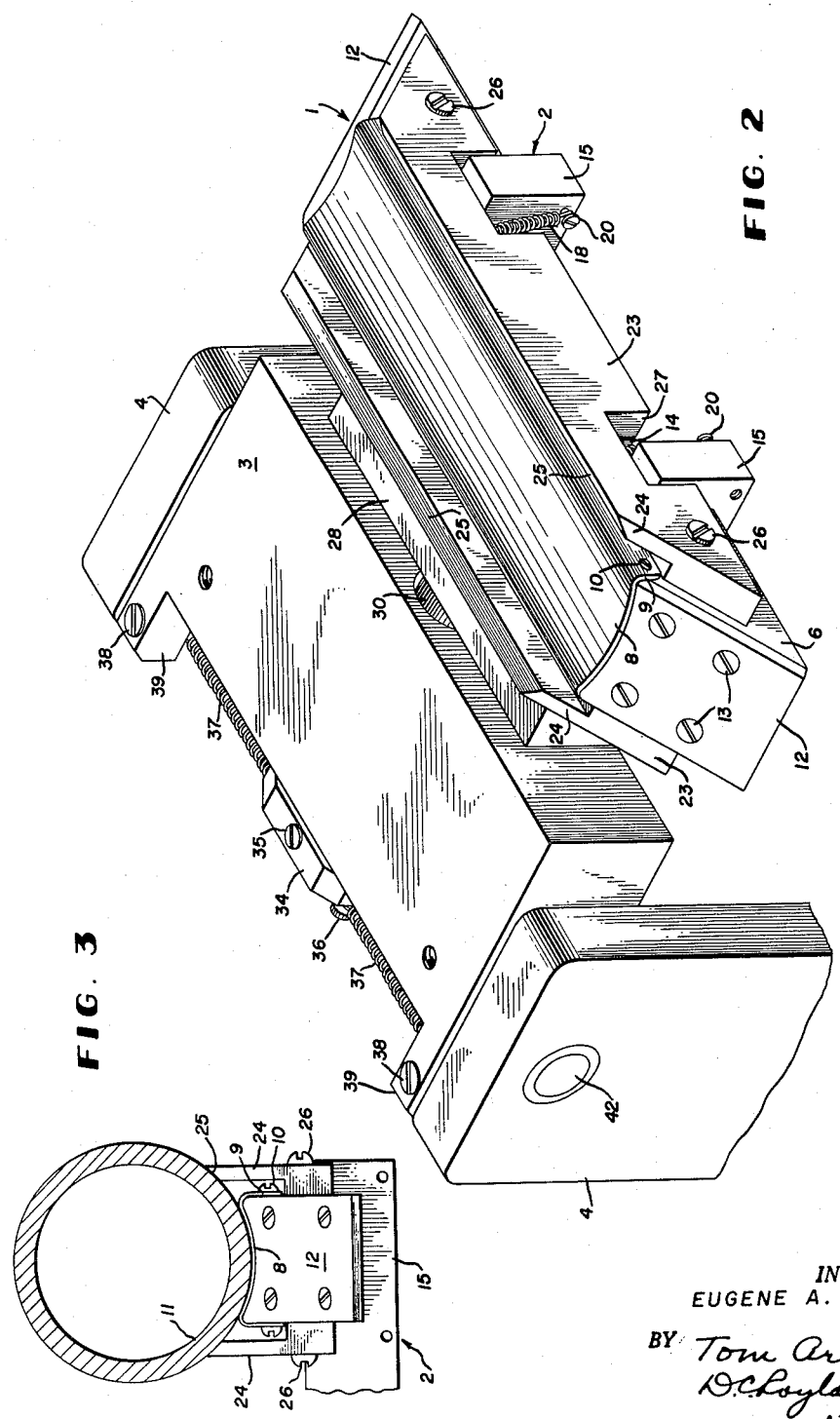

3,170,114
MAGNETIC INSPECTION SEARCH SHOE MOUNT PROVIDING MOVEMENT ABOUT MULTIPLE ORTHOGONAL AXES
Eugene A. Placke, Houston, Tex., assignor, by mesne assignments, to American Machine & Foundry Company, New York, N.Y., a corporation of New York
Filed July 18, 1960, Ser. No. 43,375
16 Claims. (Cl. 324—37)

This invention relates to universal mounts for devices to be held in engagement with an axially moving elongated member, the invention finding particular application to the mounting of search shoes of apparatus for magnetic inspection of ferromagnetic members such as pipe.

In the art of inspecting metal pipe and the like for flaws and other discontinuities, it has become common practice to magnetize the member to be inspected, magnetization being carried out in such fashion that discontinuities in the member will distort the magnetic field in a characteristic manner detectable by means of a search coil or other magneto-responsive pickup device moved through the distorted area of the field. Thus, for example, the member to be inspected can be magnetized by any of the methods referred to in U.S. Patent 2,878,446, issued March 17, 1959 to Berry G. Price, Julian H. Unger and Fenton M. Wood, inspection being carried out by moving the member axially past a relatively fixed search shoe which carries the pickup coil, the search shoe bearing against the outer surface of the member being inspected so that, when a discontinuity in the member is encountered, the search coil cuts the distorted area of the magnetic flux and a signal is induced in the coil. Assuming that the member being inspected has a cylindrical outer surface, the member is continuously rotated during its axial movement, and the search shoe accordingly scans the member helically.

In carrying out such inspections, a particular problem arises because of the need for not only maintaining the search coil or pickup device in close proximity to the member being inspected but also eliminating, or at least greatly minimizing relative movement between the search coil and the member other than that relative movement purposely caused to carry out scanning. Thus, the search coil must follow the surface of the member as accurately and constantly as possible, else noise signals and false indications are likely to result. Were the member to be inspected truly straight and free from irregularities, maintaining of the search coil in proper position with respect to the member would present no unusual difficulties. In actual practice in the field, however, the member to be inspected frequently has various types of irregularities which make it difficult to maintain the proper positional relationship between the coil and the member.

A general object of the present invention is to devise an improved mount of the type described which will allow a search shoe or the like to be maintained accurately and constantly engaged with an axially moving elongated member.

Another object is to provide a universal mount for a search shoe of a magnetic inspection apparatus which mount allows the search shoe to follow freely and automatically the movement of the member being inspected.

A further object is to devise a universal mount capable of maintaining a search coil or the like in substantial parallelism with an axially moving elongated member.

In order that the manner in which these and other objects are attained in accordance with the invention can be understood in detail, reference is had to the accompanying drawings, which form a part of this specification, and wherein:

FIG. 1 is an exploded perspective view of elements forming a universal search shoe mount, constructed in accordance with one embodiment of the invention, for use in apparatus for magnetic inspection of ferromagnetic tubular members;

FIG. 2 is a perspective view of the assembled universal search shoe mount;

FIG. 3 is a fragmentary end elevational view of a portion of the device of FIG. 2, illustrating the relative positions of the search shoe and the tubular member to be inspected during use of the device;

FIG. 4 is a view, partly in vertical section transverse to the line of travel of the tubular member to be inspected, and partly in elevation, of the device of FIG. 2 and typical frame means supporting the same, and FIG. 5 is a fragmentary transverse sectional view, taken on line 5—5, FIG. 1.

Referring now to the drawings in detail, and first to FIGS. 2 and 5, it will be seen that the embodiment of the invention chosen for illustration comprises a search shoe 1, carried by a yoke 2, the yoke in turn being supported by a block 3 mounted on uprights 4 which are rigidly mounted on a base frame 5.

The search shoe comprises an elongated main body 6 recessed at its top, as seen in FIG. 5, to receive one or more search coils, indicated schematically at 7, forming the pickup device or devices of a magnetic inspection apparatus. The recessed portion of body 6 is closed by a non-magnetic sheet metal top plate 8 which has an arcuate transverse cross-section and dependent side flanges 9, the top plate being secured to body 6 by screws 10 extending through flanges 9. The search shoe of this embodiment is intended to be maintained in flush engagement with the outer cylindrical surface of a piece of pipe 11 to be inspected, the transverse cross-section of plate 8 thus being concave with the same radius of curvature as such outer surface. Pipe 11 can be fed axially along the search shoe from either end of the shoe, the end faces of body 6 being slanted downwardly and away from yoke 2, each end face being protected by a striker plate 12 secured to body 6 by screws 13.

Body 6 is provided with two spaced, parallel, downwardly opening cross channels 14 which extend transversely completely through the body and are dimensioned and positioned to loosely accommodate the spaced, parallel arms 15 of yoke 2. From each end portion of body 6, there projects into the adjacent channel 14 a fixed, axially extending coaxially aligned pivot pin 16, each pivot pin 16 being received in a different one of two coaxial plain bearing openings 17 provided each in a different one of yoke arms 15. The common axis of pins 16 extends horizontally and is centered with respect to body 6 and cover plate 8. Thus, the search shoe is pivotally mounted on yoke 2 for movement about an axis which, as will be seen hereinafter, is parallel to the axial path to be followed by pipe 11.

The search shoe is resiliently biased to a normal position, in which the pivoted axis of the shoe and the center of curvature of plate 8 lie in a vertical plane, by means of two pairs of tension springs connected between body 6 and yoke arms 15. Springs 18 are each connected at one end to the side of body 6 opposite block 3 by means of screws 19 and at the other end to yoke arms 15 by screws 20. Springs 21 are connected at one end to the other side of body 6 by screws (not shown) opposing screws 19 and at the other end to arms 15 by screws 22. The screws to which the upper ends of the springs connect are positioned to extend through flanges 9, the points of connection of the springs to body 6 thus being well above the pivotal axis of the search shoe. Springs 18 and 21 are of equal strength.

To each side of body 6, there is attached a guide block 23 having an elongated upright flange 24. Flanges 24 project above plate 8 and terminate in longitudinally extending edges 25 which are arcuate in transverse cross-section and which lie in a common cylindrical surface. This cylindrical surface can include the face of plate 8, as illustrated in FIG. 3, in which case pipe 11 rides on plate 8 as well as edges 25, or can extend a very small distance above plate 8, in which case pipe 11 engages only edges 25. Guide blocks 23 are secured by screws 26 and are provided with notches 27, aligned with channels 14, to accommodate yoke arms 15.

Yoke 2 includes a cross bar 28 which is integral with arms 15 and extends parallel to the pivotal axis defined by bearing openings 17. The tip 29 of cylindrical yoke shaft 30 extends through a central opening in cross bar 28, the shaft being rigidly secured to the cross bar, as by pin 31. Shaft 30, parallel to and centered between arms 15, extends within a bore 32 through block 3, tip portion 33 of the shaft projecting beyond block 3. A small block 34 is fixed to tip portion 33 of the yoke shaft by set screw 35 and carries a pair of screws 36 opposed diametrically across the shaft. The yoke is resiliently biased to a normal position, in which arms 15 lie in a horizontal plane, by two tension springs 37, each having one of its ends connected to a different one of screws 36 and the other of its ends connected to a different one of two screws 38 secured in ears 39 formed integrally with and projecting from block 3.

Uprights 4 are each rigidly secured to a different one of two spaced, parallel, horizontal members 40 of frame 5. Each upright 4 is provided with a bearing opening 41, openings 41 being coaxially aligned. Block 3 is provided with a pair of coaxially aligned stub shafts 42 each engaged in a different one of openings 41, so that block 3 is thus mounted for pivotal movement about a horizontal axis determined by openings 41. At their lower ends, the uprights are connected by a horizontal member 43 disposed below block 3. Member 43 has a vertical opening 44 aligned below a pair of spaced, dependent ears 45 formed integrally with block 3. A push rod 46 has its upper end connected to block 3 by means of a pivot pin 47 fixed to the rod and journaled in ears 45, pin 47 extending parallel to the axis defined by bearing openings 41. A helical compression spring 48 is disposed between an upper stop washer 49, held in place by nuts 50 threaded on rod 46, and a lower stop plate 51 engaging the upper surface of member 43. Thus, the combination including spring 48 and rod 46 is effective to resiliently bias block 3, yoke 2 and search shoe 1 upwardly so that, assuming that the pipe 11 to be inspected is being fed axially past the search shoe, the search shoe is biased resiliently into engagement with the pipe. Rod 46 projects downwardly through opening 44 and is provided at its lower end with a fixed collar 52 of such size as to engage member 43, limiting upward travel of the search shoe, when work, such as pipe 11, is not in place above the search shoe.

Considering FIG. 4, it will be understood that elongated horizontally extending frame members 53 can be employed and that any suitable means (not shown) for feeding and guiding a work to be inspected, such as pipe 11, can be mounted on the frame members 53.

It will be obvious from the foregoing that the device described constitutes a universal mount for the search shoe 1, since the search shoe is allowed freedom for various degrees of movement with respect to pipe 11 or like work being fed past the search shoe. Thus, the search shoe is allowed to turn, on yoke 2, about the normally horizontal axis defined by bearing opening 17. The search shoe is also allowed to tip and tilt about the axis of yoke shaft 30. Finally, the search shoe is allowed to swing about the horizontal axis defined by bearing openings 41, which axis extends parallel to the path of travel of the work. With respect to the first two types of movement mentioned, the search shoe is resiliently biased to a normal position by springs 18, 21 and springs 37, respectively. With respect to the third type of movement, spring 48 has a biasing action effective to maintain the search shoe in constant engagement with the work.

It will be recognized by those skilled in the art that the particular embodiment shown and described represents only one typical example of the invention and that various changes and modifications can be made without departing from the scope of the invention as defined in the appended claims.

What is claimed is:

1. In a mount for a device to be maintained in close proximity to a surface of an elongated member moving axially past the mount, the combination of a first support means; means mounting said first support means for pivotal movement about a fixed axis parallel to and spaced from the line of travel of the elongated member; second support means mounted on and carried by said first support means for pivotal movement about a second axis extending at right angles to said fixed axis; a carrier constructed to receive and support said device, said carrier being mounted on said second support means for pivotal movement about a third axis at right angles to said second axis and spaced from said fixed axis, and yieldable means connected to said first support means and operative to bias the same pivotally about said fixed axis in a direction moving said first support means toward the line of travel of the elongated member for continuously urging the first support means to a normal position when displaced therefrom by the elongated member.

2. A mount in accordance with claim 1 and further comprising resilient means connected to said second support means and operative to bias the same to a normal position in which said fixed axis and said third axis are parallel.

3. A mount in accordance with claim 2 and further comprising additional resilient means connected to said carrier and operative to bias the same pivotally about said third axis to a predetermined normal position.

4. In a mount for the search coil of an apparatus for magnetic inspection of elongated ferromagnetic members moved axially past the search coil, the combination of a first support; means mounting said first support for pivotal movement about a first axis; a second support mounted on and carried by said first support for pivotal movement about a second axis at right angles to said first axis; a search shoe constructed to receive and carry the search coil, said search shoe being mounted on said second support for pivotal movement about a third axis at right angles to said second axis; and yeildable means connected to bias the combination of said first and second supports and said search shoe pivotally about said first axis to move said search shoe toward the line of travel of the elongated member to be inspected for continuously urging the first support means to a normal position when displaced therefrom by the elongated member.

5. A mount in accordance with claim 4 and further comprising resilient means connected to said second support and operative to bias the same to a normal position in which said first and third axes are parallel.

6. A mount in accordance with claim 5 and further comprising additional resilient means connected to said search shoe and operative to bias the same piovtally about said third axis to a predetermined normal position.

7. In a mount for the search coil of an apparatus for magnetic inspection of elongated ferromagnetic members moved axially past the search coil, the combination of a search shoe constructed to receive and support the search coil, said search shoe including guide means constructed and arranged for sliding engagement with and to at least partially encompass both sides of the elongated member to be inspected; support means, said search shoe being mounted on said support means for pivotal movement about an axis perpendicular to the axis of the member to be inspected and spaced therefrom and arranged for engagement with the member to be inspected; and means supporting said support means for pivotal movement about an axis parallel to the axis of the member to be inspected and spaced therefrom.

8. In a mount for a search coil of an apparatus for magnetic inspection of axially moving elongated ferromagnetic members, the combination of a first support having a bore; means mounting said first support for pivotal movement about a first axis extending at right angles to the axis of said bore; a second support comprising a shaft journaled in said bore, whereby said second support is mounted for pivotal movement about the axis of said bore; and a search shoe constructed to receive and carry the search coil, said search shoe being provided with at least one elongated surface adapted for sliding engagement with the axially moving elongated member to be inspected, said search shoe being mounted on said second support for pivotal movement about a second axis spaced from and parallel to said at least one elongated surface, the combination of said first and second supports and said search shoe being biased pivotally about said first axis in a direction tending to move said search shoe toward the line of travel of the elongated members to be inspected.

9. A mount in accordance with claim 8 and further comprising resilient means operative to bias said second support pivotally about the axis of said bore to a normal position in which said first and second axes are parallel, said resilient means comprising a pair of opposed tension springs each having one of its ends connected to said shaft and the other of its ends connected to said first support.

10. A mount in accordance with claim 8 and wherein said second support comprises a pair of spaced, parallel arms extending at right angles to said first axis, each of said arms being provided with a bearing opening and said bearing openings having a common axis extending at right angles to said shaft, and said search shoe is provided with a pair of pivot pins each journaled in a different one of said bearing openings.

11. A mount in accordance with claim 10 and further comprising resilient means operative to bias said search shoe pivotally about the common axis of said bearing openings to a predetermined normal position, said resilient means including a pair of oppositely acting tension springs each having one end connected to one of said arms and the other end connected to a different side of said search shoe.

12. In a mount for a search coil of an apparatus for magnetic inspection of elongated ferromagnetic members moved axially along a predetermined path, the combination of a pair of spaced uprights disposed adjacent to the path of travel of the members to be inspected; a first support disposed between said uprights and mounted thereon for pivotal movement about a horizontal axis spaced from said path of travel; a second support including a shaft; bearing means carried by said first support and in which said shaft is journaled, said shaft extending at right angles to said horizontal axis; a search shoe constructed to receive and carry the search coil; means mounting said search shoe on said second support for pivotal movement about an axis extending at right angles to the axis of said shaft; and means biasing the combination of said first and second supports and said search shoe pivotally about said horizontal axis in a direction to move said search shoe toward said path of travel.

13. A mount in accordance with claim 12 and further comprising resilient means connected to said second support to bias the same pivotally about the axis of said shaft to a normal position in which the axes of pivotal movement of said first support and said search shoe are parallel.

14. A mount in accordance with claim 4 and further comprising guide means mounted on said search shoe and adapted to at least partially encompass the axially moving elongated member to be inspected and align said search shoe with respect to the elongated member to be inspected.

15. A mount in accordance with claim 8 and further comprising guide means mounted on said search shoe adapted to at least partially encompass the axially moving elongated member to be inspected and align said search shoe with respect to the elongated member to be inspected.

16. A mount in accordance with claim 12 and further comprising guide means mounted on said search shoe and adapted to at least partially encompass the axially moving elongated member to be inspected and align said search shoe with respect to the elongated member to be inspected.

References Cited by the Examiner
UNITED STATES PATENTS

| | | | |
|---|---|---|---|
| 657,502 | 9/00 | Swan | 248—284 |
| 980,580 | 1/11 | Williams | 248—284 X |
| 1,036,676 | 8/12 | Miller | 248—284 X |
| 2,250,460 | 7/41 | Barnes et al. | 324—37 |
| 2,998,566 | 8/61 | Cochran | 324—37 |
| 3,006,254 | 11/62 | Price et al. | 324—37 |

WALTER L. CARLSON, *Primary Examiner.*

LLOYD McCOLLUM, *Examiner.*